(12) United States Patent
Oshikawa et al.

(10) Patent No.: US 10,207,577 B2
(45) Date of Patent: Feb. 19, 2019

(54) TRACTOR (71) Applicant: KOMATSU LTD., Tokyo (JP)

(72) Inventors: Yuushi Oshikawa, Komatsu (JP);
Takashi Noda, Hirakata (JP); Taira Ozaki, Ikoma (JP); Takuya Uemura, Hirakata (JP); Yuya Takahashi, Hirakata (JP); Masami Hirayama, Hirakata (JP); Hiroshi Itogawa, Kyotanabe (JP)

(73) Assignee: KOMATSU LTD., Tokyo (JP)

( * ) Notice: Subject to any disclaimer, the term of this patent is extended or adjusted under 35 U.S.C. 154(b) by 0 days.

(21) Appl. No.: 15/553,325

(22) PCT Filed: Dec. 8, 2015

(86) PCT No.: PCT/JP2015/084425
§ 371 (c)(1),
(2) Date: Aug. 24, 2017

(87) PCT Pub. No.: WO2017/068734
PCT Pub. Date: Apr. 27, 2017

(65) Prior Publication Data
US 2018/0056776 A1 Mar. 1, 2018

(30) Foreign Application Priority Data
Oct. 23, 2015 (JP) .................. 2015-208873

(51) Int. Cl.
*B60K 11/08* (2006.01)
*B60K 11/04* (2006.01)
(Continued)

(52) U.S. Cl.
CPC .......... *B60K 11/04* (2013.01); *B60H 1/00457* (2013.01); *B60K 11/06* (2013.01);
(Continued)

(58) Field of Classification Search
CPC ....... B60K 11/04; B60K 11/08; B60K 11/085; B60H 1/00457; B62D 49/00; E02F 9/0866
See application file for complete search history.

(56) References Cited

U.S. PATENT DOCUMENTS 1,333,418 A * 3/1920 Holmes .................. B62D 49/06
180/291
3,319,732 A * 5/1967 Soeteber .................. F01P 11/10
180/68.1
(Continued)

FOREIGN PATENT DOCUMENTS

JP 11-280112 A 10/1999
JP 11-310938 A 11/1999
(Continued)

OTHER PUBLICATIONS

The International Search Report for the corresponding international application No. PCT/JP2015/084425, dated Mar. 1, 2016.
(Continued)

*Primary Examiner* — James A Shriver, II
*Assistant Examiner* — Steve Clemmons
(74) *Attorney, Agent, or Firm* — Global IP Counselors, LLP (57) ABSTRACT

A tractor includes a vehicle body, an engine, a cooling device, a fan, and a first exterior member. The engine is disposed on the front side of the vehicle body. The cooling device is disposed behind the engine. The fan is arranged to produce cooling air for the cooling device. The first exterior member is disposed on the front side of the vehicle body and covers the engine, the cooling device, and the fan. A first discharge port is arranged to discharge the cooling air and is provided in a first side surface of the first exterior member. The front side surface is positioned on a first side in the
(Continued)

vehicle left-right direction. The front surface of the first exterior member includes no opening.

12 Claims, 6 Drawing Sheets

(51) Int. Cl.
| | |
|---|---|
| *B60H 1/00* | (2006.01) |
| *B62D 49/00* | (2006.01) |
| *E02F 9/08* | (2006.01) |
| *E02F 3/76* | (2006.01) |
| *E02F 9/20* | (2006.01) |
| *B60K 11/06* | (2006.01) |

(52) U.S. Cl.
CPC .............. *B60K 11/08* (2013.01); *B62D 49/00* (2013.01); *E02F 3/7604* (2013.01); *E02F 9/0866* (2013.01); *E02F 9/205* (2013.01); *B60Y 2200/411* (2013.01)

(56) References Cited

U.S. PATENT DOCUMENTS

| | | | | |
|---|---|---|---|---|
| 4,081,050 A | * | 3/1978 | Hennessey | B60K 11/04 180/233 |
| 4,567,956 A | * | 2/1986 | Matsuda | B60K 11/00 180/68.1 |
| 5,036,931 A | * | 8/1991 | Iritani | B60K 11/08 180/68.1 |
| 5,209,314 A | * | 5/1993 | Nishiyama | B60K 11/04 180/68.6 |
| 5,660,244 A | * | 8/1997 | Matsuda | B60K 11/04 180/68.1 |
| 5,678,648 A | * | 10/1997 | Imanishi | B60K 11/08 180/68.1 |
| 5,887,671 A | * | 3/1999 | Yuki | B60K 11/08 180/68.1 |
| 7,143,852 B2 | | 12/2006 | Yatsuda | B62D 25/10 180/69.2 |
| 7,717,218 B2 | | 5/2010 | Matsumoto et al. | |
| 7,753,152 B2 | * | 7/2010 | Nakae | B60K 11/04 165/122 |
| 8,205,701 B2 | * | 6/2012 | Kuramoto | B62D 25/10 180/291 |
| 8,505,661 B2 | * | 8/2013 | Tsuji | E02F 3/7609 180/68.4 |
| 8,657,048 B2 | | 2/2014 | Uetake | |
| 8,789,637 B1 | * | 7/2014 | Kinoshita | B62D 21/10 180/69.2 |
| 8,905,180 B2 | * | 12/2014 | Sakurahara | E02F 9/0858 180/291 |
| 8,936,122 B2 | * | 1/2015 | MacGregor | B60K 11/04 180/68.1 |
| 8,960,342 B2 | | 2/2015 | Werner et al. | |
| 9,061,582 B2 | | 6/2015 | Sawada | |
| 9,315,097 B2 | * | 4/2016 | Ducroquet | B62D 49/00 |
| 9,327,582 B2 | | 5/2016 | Matsumiya et al. | |
| 9,376,786 B2 | * | 6/2016 | Numasawa | E02F 9/0866 |
| 9,388,730 B2 | * | 7/2016 | Tsutsumi | B60K 11/04 |
| 2002/0053480 A1 | | 5/2002 | Pack | |
| 2003/0168269 A1 | | 9/2003 | Pfusterschmid et al. | |
| 2004/0217630 A1 | | 11/2004 | Takeuchi et al. | |
| 2005/0077062 A1 | | 4/2005 | Fukazawa et al. | |
| 2008/0023174 A1 | | 1/2008 | Nakae et al. | |
| 2010/0236855 A1 | * | 9/2010 | Matsushita | B62D 25/10 180/69.2 |
| 2012/0325569 A1 | | 12/2012 | Takeda et al. | |
| 2014/0196974 A1 | | 7/2014 | Hayashi et al. | |
| 2014/0224558 A1 | | 8/2014 | Kure | |
| 2015/0176451 A1 | * | 6/2015 | Tsutsumi | B01D 53/86 60/298 |

FOREIGN PATENT DOCUMENTS

| | | |
|---|---|---|
| JP | 2002-154340 A | 5/2002 |
| JP | 2003-326985 A | 11/2003 |
| JP | 2004-306911 A | 11/2004 |
| JP | 2005-48504 A | 2/2005 |
| JP | 2007-100351 A | 4/2007 |
| JP | 2009-35257 A | 2/2009 |
| JP | 2009-507145 A | 2/2009 |
| JP | 2009-113744 A | 5/2009 |
| JP | 2013-204295 A | 10/2013 |
| JP | 2013-248964 A | 12/2013 |
| JP | 2014-84832 A | 5/2014 |
| JP | 2014-141857 A | 8/2014 |
| WO | 2010001629 A1 | 1/2010 |
| WO | 2012/086519 A1 | 6/2012 |

OTHER PUBLICATIONS

The International Search Report for the corresponding international application No. PCT/JP2015/055084, dated Mar. 19, 2015.

* cited by examiner

TRACTOR

CROSS-REFERENCE TO RELATED APPLICATIONS

This application is a U.S. National stage application of International Application No. PCT/JP2015/084425, filed on Dec. 8, 2015. This U.S. National stage application claims priority under 35 U.S.C. § 119(a) to Japanese Patent Application No. 2015-208873, filed in Japan on Oct. 23, 2015, the entire contents of which are hereby incorporated herein by reference.

BACKGROUND

Field of the Invention

The present invention relates to a tractor to which a work implement can be attached.

Background Information

For example, the bulldozer in Japanese Laid-Open Patent Publication No. 2005-48504 has a cooling device disposed at the front end of the vehicle body. Further, a fan sends cooling air for cooling the cooling device from the engine through the cooling device in front of the engine toward the blade at the front.

SUMMARY

The bulldozer includes a discharge port formed in the front surface of the engine compartment so that the cooling air can be discharged from the front surface of the engine. As a result, there is a possibility that earth and sand can enter into the engine compartment from the front during work.

The present description discloses a tractor that can reduce the possibility of earth and sand entering into the engine compartment from the front during work.

A tractor according to a first aspect of the present invention includes a vehicle body, an engine, a cooling device, a fan, and a first exterior member. The engine is disposed on the front side of the vehicle body. The cooling device is disposed behind the engine. The fan produces cooling air for the cooling device. The first exterior member is disposed on the front side of the vehicle body and covers the engine, the cooling device, and the fan. A first discharge port for discharging the cooling air is provided in a first side surface of the first exterior member, the first side surface being positioned on a first side in the vehicle left-right direction. The front surface of the first exterior member includes no opening.

The tractor may further include a second exterior member located behind the first exterior member and including a first intake port for sucking in outside air to serve as the cooling air.

The first intake port may be provided in a second side surface of the second exterior member, the second side surface being positioned on a second side opposite the first side.

A second intake port for sucking in the outside air sucked in by the first intake port may be provided in a rear surface of the first exterior member, the rear surface being positioned behind the engine.

The vehicle body may have a work area facing the rear surface of the first exterior member.

The cooling device may be an after-cooler.

A second discharge port for discharging the cooling air may be provided on a third side surface of the first exterior member, the third side surface being positioned on the second side opposite the first side.

The tractor may further include an excavating blade on the front side of the vehicle body.

Effects of Invention

In the tractor according to the first aspect, the first discharge port for discharging the cooling air is provided in the first side surface of the first exterior member and not in the front surface of the first exterior member. Moreover, the front surface of the first exterior member includes no opening. As a result, the possibility of earth and sand entering the engine compartment covered by the first exterior member can be reduced.

DETAILED DESCRIPTION OF EMBODIMENT(S)

Figure 1:
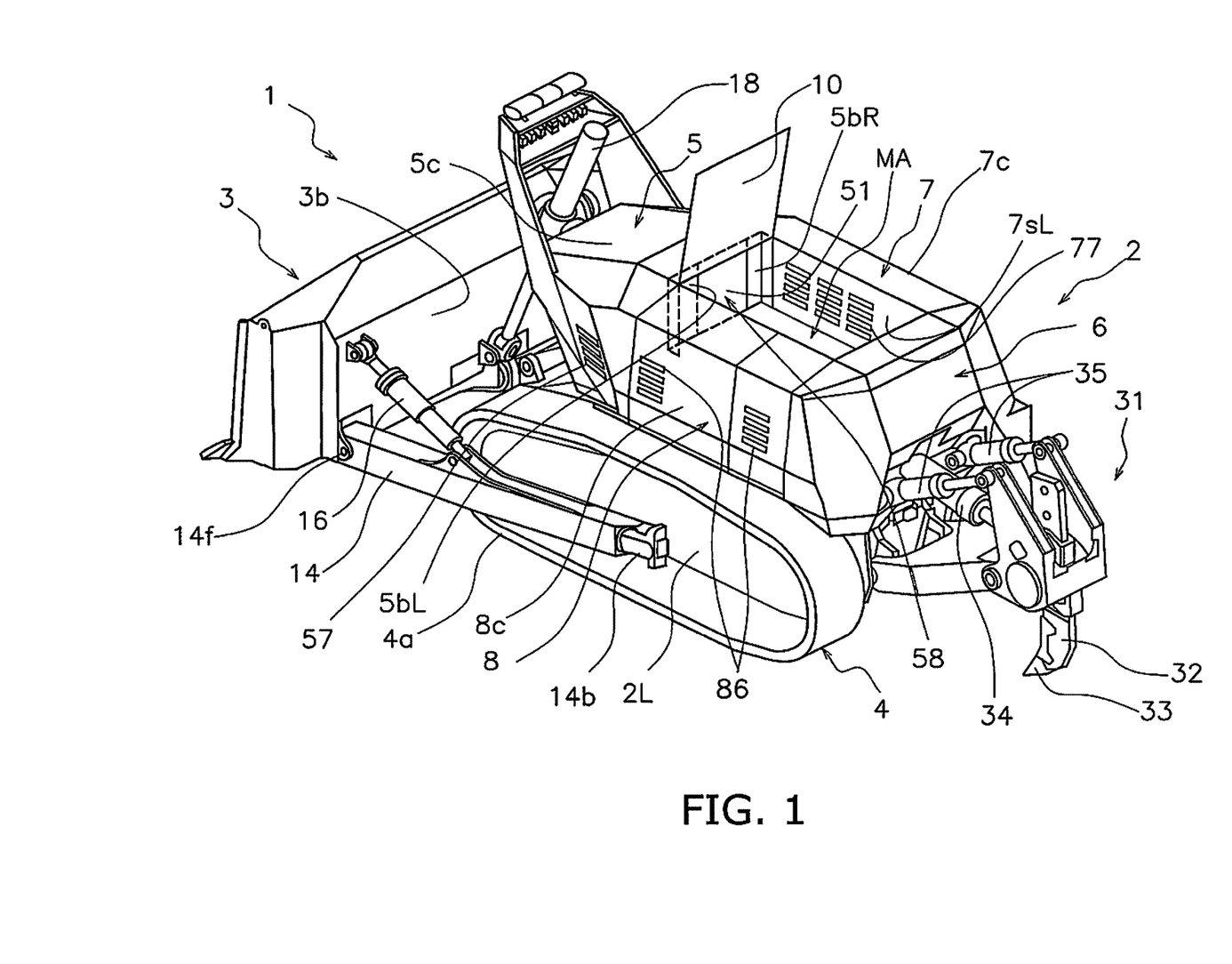
FIG. 1 is a perspective view of a work vehicle according to an embodiment.
Figure 2:
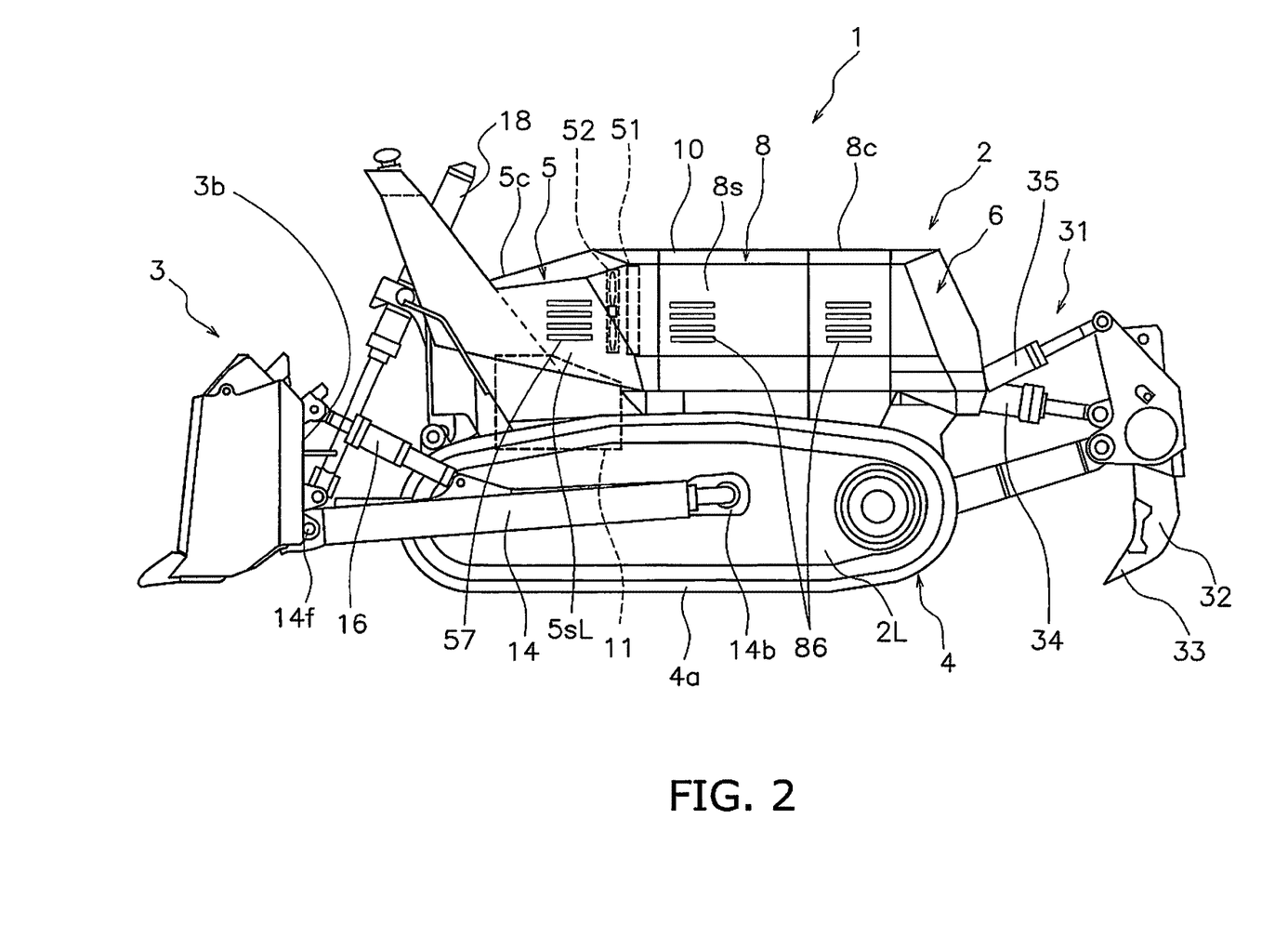
FIG. 2 is a left side view of the work vehicle.
Figure 3:
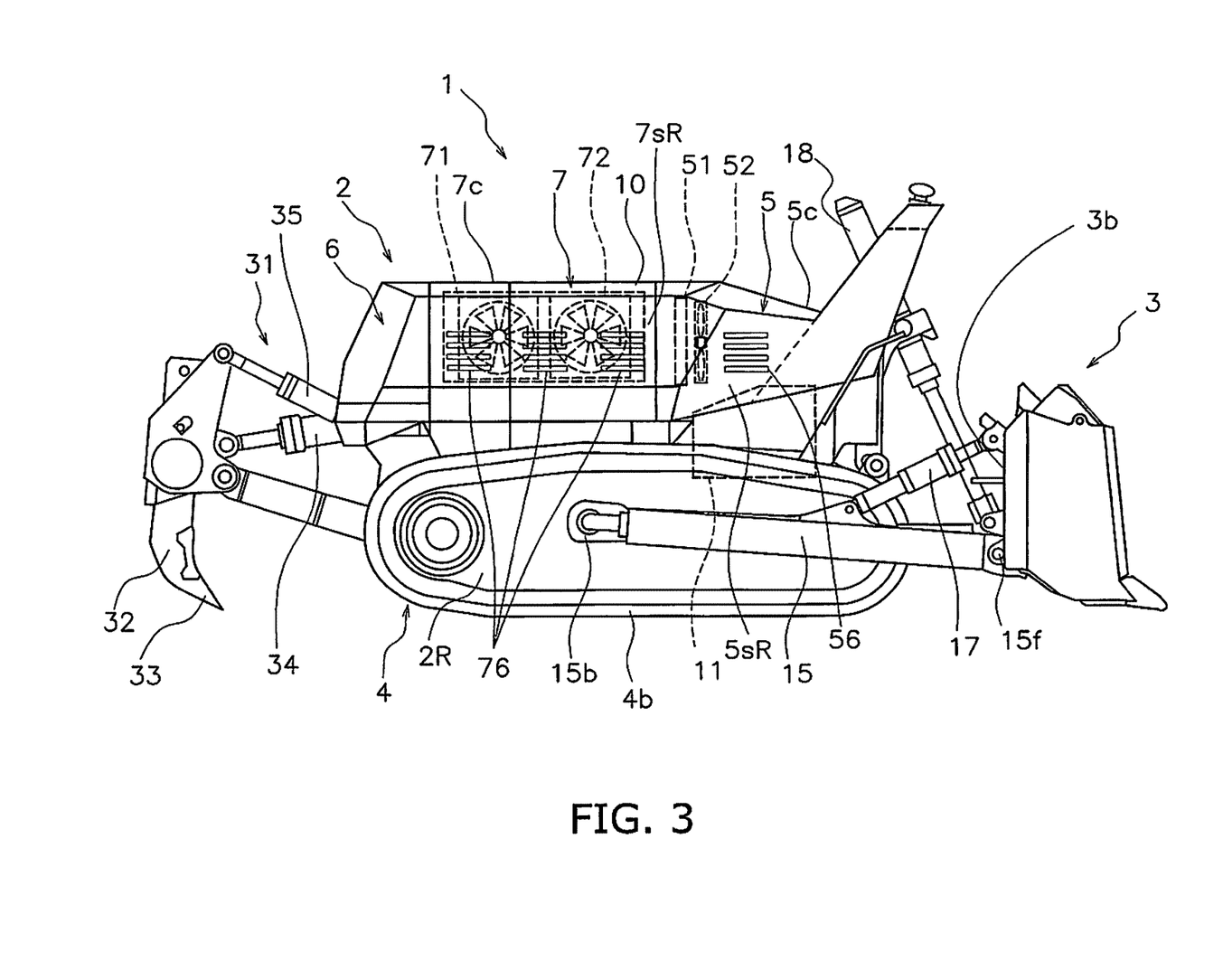
FIG. 3 is a right side view of the work vehicle.
Figure 4:
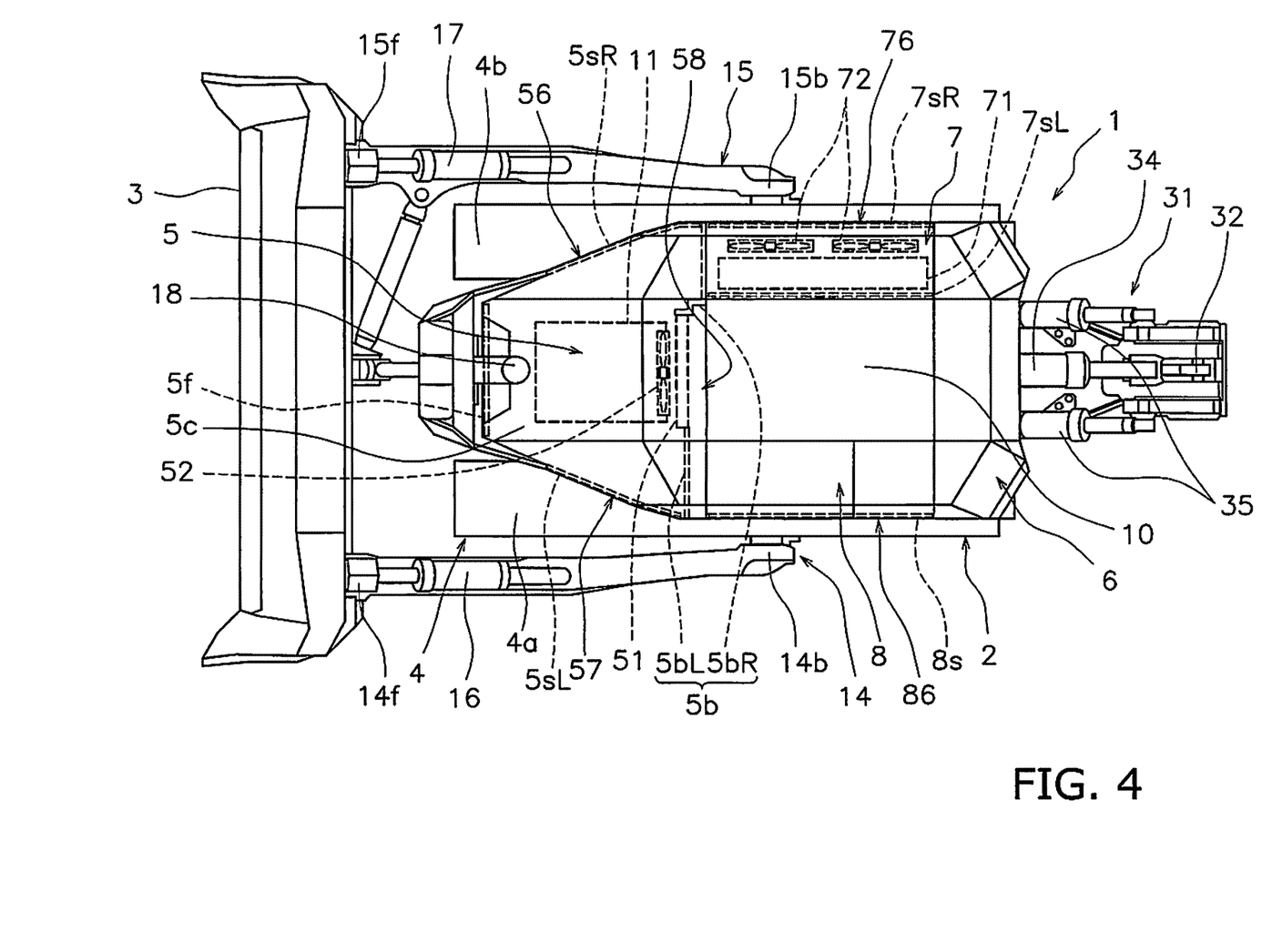
FIG. 4 is a top view of the work vehicle.
Figure 5:
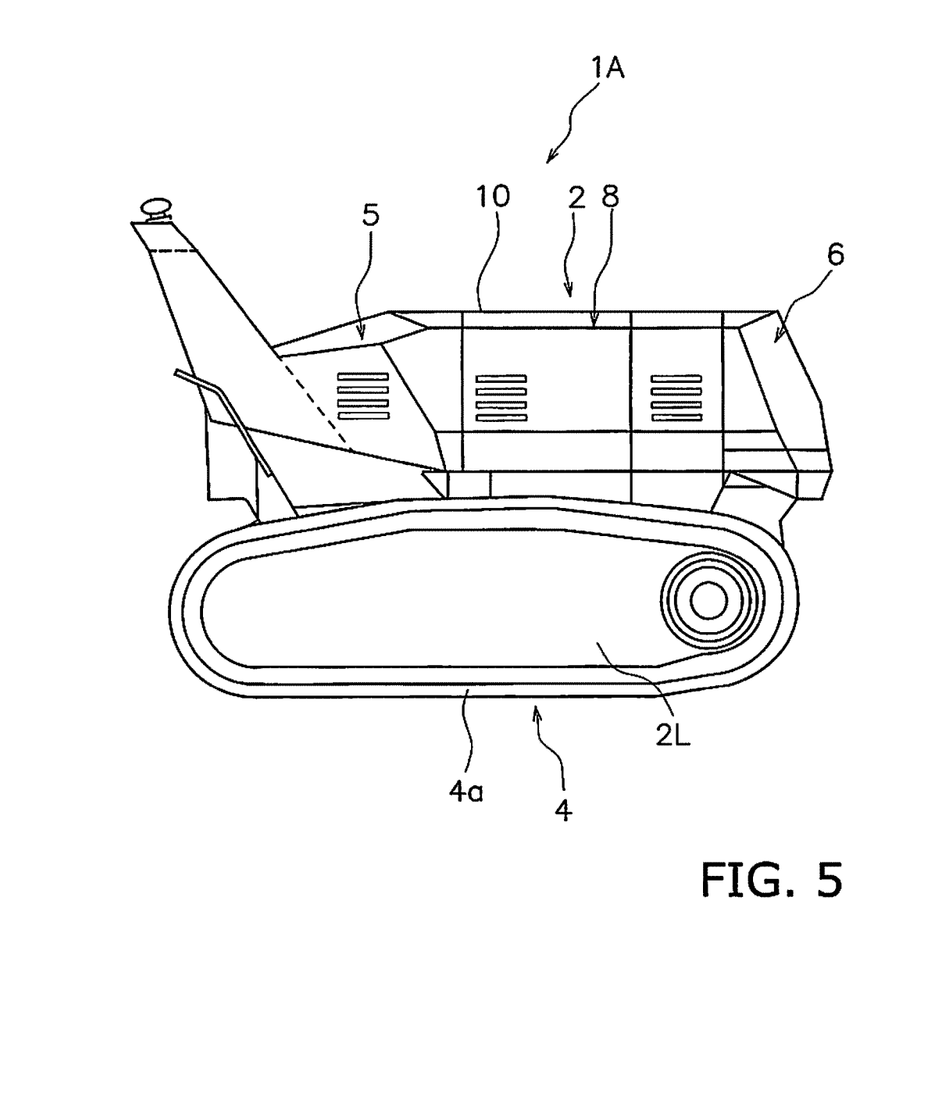
FIG. 5 is a side view of a tractor.

The following is a description of a work vehicle 1 according to an embodiment with reference to the drawings. FIG. 1 is a perspective view of the work vehicle 1 according to the present embodiment. FIG. 2 is a left side view of the work vehicle 1. FIG. 3 is a right side view of the work vehicle 1. FIG. 4 is a top view of the work vehicle 1. The work vehicle 1 is a bulldozer according to the present embodiment. The work vehicle 1 is a vehicle that is not provided with an operator cab in the present embodiment. As discussed below, the work vehicle 1 can be operated remotely. The work vehicle 1 includes a vehicle body 2, a work implement 3, and a ripper device 31. In the present embodiment, the work vehicle 1 with the work implement 3 and the ripper device 31 removed is referred to as a tractor 1A. FIG. 5 is a side view of the tractor 1A.

The vehicle body 2 includes a travel device 4 and an engine compartment 5. The travel device 4 is a device for causing the work vehicle 1 to travel. The travel device 4 includes crawler belts 4a and 4b. The crawler belt 4a is mounted on a left side portion 2L of the vehicle body 2. The crawler belt 4b is mounted on a right side portion 2R of the vehicle body 2. The work vehicle 1 travels due to the crawler belts 4a and 4b being driven.

The front direction in the present embodiment signifies the direction in which the work implement 3 is disposed on the vehicle body 2 when the work implement 3 is attached to the vehicle body 2, and the rear direction signifies the opposite direction. Left and right signify the left and right directions when facing toward the aforementioned front. The left-right direction may be paraphrased as the vehicle width direction.

The engine compartment 5 is disposed on the front side of the vehicle body 2. The engine compartment 5 is disposed forward of the center in the front-rear direction of the vehicle body 2. An engine 11, a first cooling device 51, and a first fan 52 are disposed inside the engine compartment 5. That is, the engine 11, the first cooling device 51, and the first fan 52 are disposed on the front side of the vehicle body 2. The engine 11, the first cooling device 51, and the first fan 52 are disposed forward of the center in the front-rear direction of the vehicle body 2.

The engine 11 generates driving power for driving the travel device 4. The first cooling device 51 is, for example, an after-cooler of the engine 11. The first fan 52 produces cooling air for the first cooling device 51. The first cooling device 51 is disposed behind the engine 11. The first fan 52 overlaps the rear end of the engine 11 as seen from above. The first cooling device 51 and the first fan 52 are disposed higher than the engine 11.

The engine compartment 5 is covered by a first exterior member 5c. The first exterior member 5c covers the engine 11, the first cooling device 51, and the first fan 52. The first exterior member 5c is disposed on the front side of the vehicle body 2. The first exterior member 5c is disposed forward of the center in the front-rear direction of the vehicle body 2. The first exterior member 5c includes a front surface 5f, a first side surface 5sR, a third side surface 5sL, a left rear surface 5bL, and a right rear surface 5bR. In the present embodiment, the left rear surface 5bL and the right rear surface 5bR are referred to collectively as a rear surface 5b. The first side surface 5sR is positioned on the vehicle right side. The third side surface 5sL is positioned on the vehicle left side. The front surface 5f includes no opening.

As illustrated in FIG. 3, a first discharge port 56 for discharging cooling air produced by the first fan 52 is provided in the first side surface 5sR of the first exterior member 5c. The first side surface 5sR includes the first discharge port 56. In the present embodiment, the side in the vehicle left-right direction having the side surface on which the first discharge port 56 is provided is referred to as a first side. The side opposite the first side in the vehicle left-right direction is referred to as a second side. In the example illustrated of the present embodiment, the first side corresponds to the right side and the second side corresponds to the left side. As illustrated in FIG. 2, a second discharge port 57 for discharging cooling air produced by the first fan 52 is additionally provided in the third side surface 5sL of the first exterior member 5c. The third side surface 5sL includes the second discharge port 57. The third side surface 5sL is the side surface positioned on the second side of the first exterior member 5c. The second discharge port 57 may be omitted.

As illustrated in FIGS. 1 and 4, the left rear surface 5bL and the right rear surface 5bR are positioned rearward of the engine 11. Specifically, the rear surface 5b is positioned rearward of the engine 11. A second intake port 58 is formed between the left rear surface 5bL and the right rear surface 5bR. Specifically, the rear surface 5b includes the second intake port 58. The left rear surface 5bL verges on the first cooling device 51. The right rear surface 5bR verges on the first cooling device 51.

The vehicle body 2 includes a rear housing portion 6, a right housing portion 7, and a left housing portion 8. As illustrated in FIG. 1, the engine compartment 5, the rear housing portion 6, the right housing portion 7, and the left housing portion 8 are disposed so as to surround the periphery of a work area MA. The engine compartment 5 is disposed in front of the work area MA. The rear housing portion 6 is disposed behind the work area MA. The right housing portion 7 is disposed to the right of the work area MA. The left housing portion 8 is disposed to the left of the work area MA.

The rear surface 5b faces the work area MA. Therefore, a worker is able to easily perform maintenance and inspect the first cooling device 51 by entering the work area MA.

As illustrated in FIG. 4, a second cooling device 71 and a second fan 72 are disposed in the right housing portion 7. The second cooling device 71 is, for example, a radiator for cooling a cooling medium for cooling the engine 11. The second cooling device 71 may further include an oil cooler that cools hydraulic fluid. The second fan 72 produces cooling air for the second cooling device 71. The right housing portion 7 is covered by a third exterior member 7c. The third exterior member 7c is positioned behind the first exterior member 5c.

The third exterior member 7c includes a fourth side surface 7sR and a fifth side surface 7sL. The fourth side surface 7sR is the side surface positioned on the first side of the third exterior member 7c. The fifth side surface 7sL is the side surface positioned on the second side of the third exterior member 7c. A third discharge port 76 for discharging cooling air produced by the second fan 72 is provided in the fourth side surface 7sR of the third exterior member 7c. The fourth side surface 7sR includes the third discharge port 76. As illustrated in FIG. 1, a third intake port 77 is provided in the fifth side surface 7sL of the third exterior member 7c. The fifth side surface 7sL includes the third intake port 77.

A door (not illustrated) for opening and closing the right housing portion 7 is provided facing the work area MA on the right housing portion 7. Specifically, the third exterior member 7c includes the door. A worker is able to access the inside of the right housing portion 7 from the work area MA by opening the door of the right housing portion 7.

The rear housing portion 6 is, for example, a fuel tank that stores fuel for the engine 11. A hydraulic fluid tank, for example, is disposed in the left housing portion 8. However, the items housed in the housing portions 7 and 8 are not limited to the above items and may be changed. The left housing portion 8 is covered by a second exterior member 8c. The second exterior member 8c is positioned behind the first exterior member 5c. The second exterior member 8c includes a second side surface 8s. The second side surface 8s is a side surface positioned on the second side of the second exterior member 8c. A first intake port 86 for sucking in outside air to serve as the aforementioned cooling air is provided in the second side surface 8s of the second exterior member 8c. The second side surface 8s includes the first intake port 86.

A lid member 10 is disposed above the work area MA. The lid member 10 is disposed so as to be able to open and close the work area MA. The lid member 10 is depicted as open in FIG. 1 and the lid member 10 is depicted as closed in FIGS. 2 to 4.

While the lid member 10 is closed, outside air sucked in through the aforementioned first intake port 86 is sent to the work area MA and thereafter to the second intake port 58 and the third intake port 77. The second intake port 58 sucks in the outside air sucked in through the first intake port 86. The outside air then is discharged via the first fan 52 from the first discharge port 56 (and the second discharge port 57) after cooling the first cooling device 51. Moreover, the third intake port 77 also sucks in the outside air sucked in through the first intake port 86. The outside air then is discharged via the second fan 72 from the third discharge port 76 after cooling the second cooling device 71.

The work implement 3 is disposed in front of the vehicle body 2. The work implement 3 is disposed in front of the engine compartment 5. In the present embodiment, the work implement 3 is an excavating blade. The work implement 3 is supported by a left arm 14 and a right arm 15.

One end 14b of the left arm 14 is attached to the left side portion 2L of the vehicle body 2. The left side portion 2L is positioned on the second side of the vehicle body 2. The left side portion 2L is positioned below the first exterior member 5c and the second exterior member 8c. Another end 14f of the left arm 14 is attached to a back surface 3b of the excavating blade.

One end 15b of the right arm 15 is attached to the right side portion 2R of the vehicle body 2. The right side portion 2R is positioned on the first side of the vehicle body 2. The right side portion 2R is positioned below the first exterior member 5c and the third exterior member 7c. Another end 15f of the right arm 15 is attached to the back surface 3b of the excavating blade. The first discharge port 56 faces the right arm 15 as seen in a top view. The second discharge port 57 faces the left arm 14 as seen in a top view. The first intake port 86 faces the crawler belt 4a as seen in a top view. The third discharge port 76 faces the crawler belt 4b as seen in a top view.

A left tilt cylinder 16, a right tilt cylinder 17, and a lift cylinder 18 are attached to the work implement 3. The left tilt cylinder 16 is attached to the left side portion 2L of the vehicle body 2. The right tilt cylinder 17 is attached to the right side portion 2R of the vehicle body 2. The left tilt cylinder 16 and the right tilt cylinder 17 are driven by hydraulic fluid from a hydraulic pump 12 (see FIG. 6). The left tilt cylinder 16 and the right tilt cylinder 17 cause the work implement 3 to move to the left or right.

The lift cylinder 18 is attached to the center portion of the vehicle body 2 in the vehicle width direction. Only one lift cylinder 18 is provided in the work vehicle 1. The lift cylinder 18 is disposed in front of the engine compartment 5. The lift cylinder 18 is disposed behind the work implement 3. The lift cylinder 18 is driven by hydraulic fluid from the hydraulic pump 12. The lift cylinder 18 causes the work implement 3 to move up and down.

The ripper device 31 is disposed behind the vehicle body 2. The ripper device 31 is attached to the rear portion of the vehicle body 2. The ripper device 31 performs cutting and pulverizing using tractive force from the travel device 4 by piercing rocks and the like with a ripper tip 33 attached to the tip end of a shank 32 that protrudes substantially vertically downward. Moreover, the ripper device 31 is driven by hydraulic cylinders (ripper lift cylinder 34, ripper tilt cylinder 35).

Figure 6:
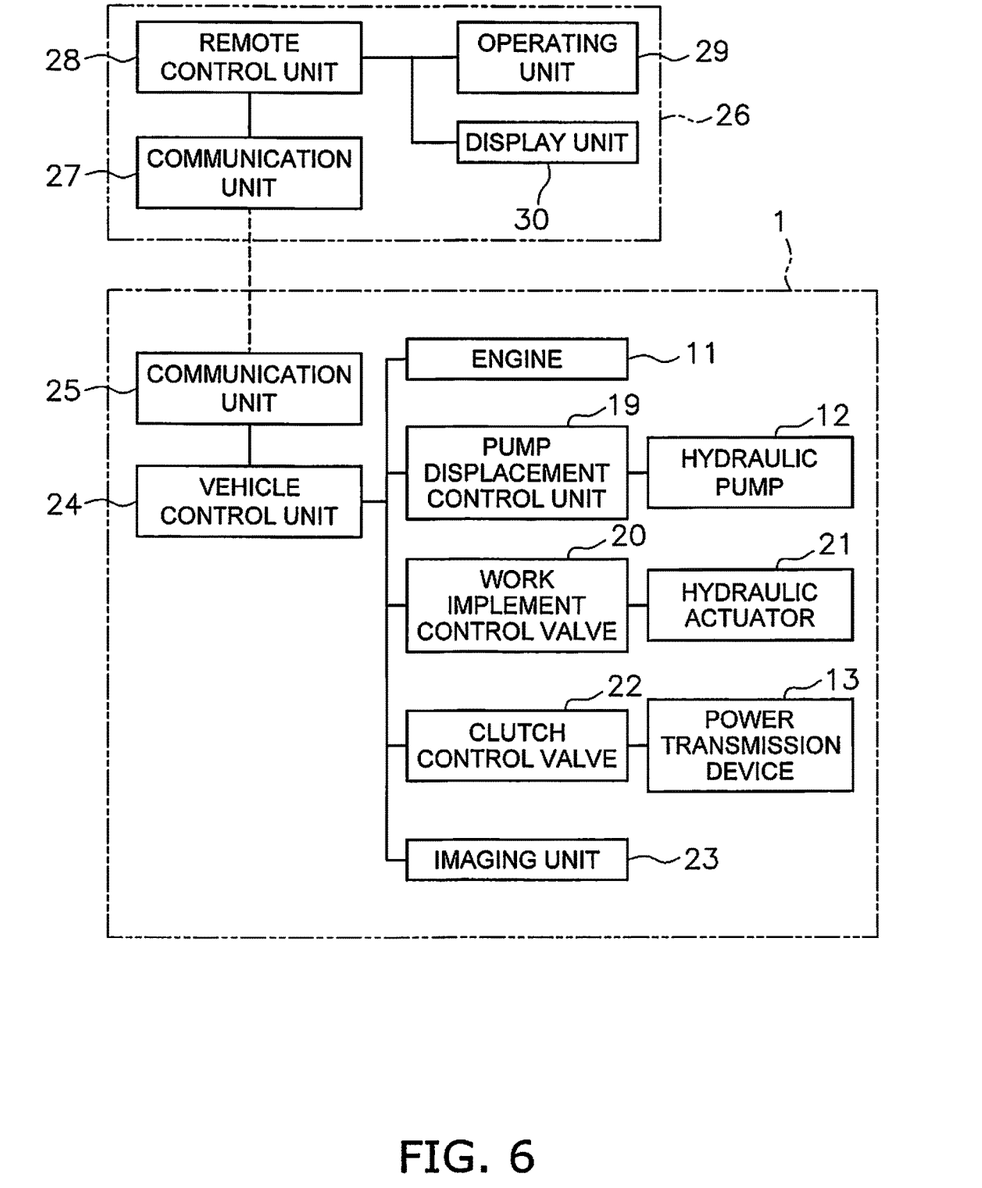
FIG. 6 is a block diagram illustrating a control system of the work vehicle.

FIG. 6 is a block diagram of a control system provided in the work vehicle 1. As illustrated in FIG. 6, the work vehicle 1 includes the hydraulic pump 12 and a pump displacement control unit 19. The hydraulic pump 12 is driven by the engine 11 to discharge hydraulic fluid. The hydraulic pump 12 is a variable displacement pump and the pump displacement control unit 19 controls the discharge displacement of the hydraulic pump 12.

The work vehicle 1 includes a work implement control valve 20 and a hydraulic actuator 21. The hydraulic actuator 21 is driven by hydraulic fluid discharged from the hydraulic pump 12. For example, the hydraulic actuator 21 includes the abovementioned lift cylinder 18 and the left and right tilt cylinders 16 and 17 of the work implement 3. Further, the hydraulic actuator 21 includes the lift cylinder 34 and the tilt cylinder 35 of the ripper device 31. The work implement control valve 20 controls the supply and exhaust of the hydraulic fluid to and from the hydraulic actuator 21.

The work vehicle 1 includes a power transmission device 13 and a clutch control valve 22. The power transmission device 13 includes, for example, a transmission and a torque converter. The clutch control valve 22 controls the switching of a speed change clutch, a forward/reverse clutch, and a steering clutch and the like included in the power transmission device 13.

The work vehicle 1 includes an imaging unit 23. The imaging unit 23 captures images of the surroundings of the work vehicle 1 with cameras (not illustrated) attached to the work vehicle 1.

The work vehicle 1 includes a vehicle control unit 24 and a communication unit 25. The communication unit 25 is connected to an antenna (not illustrated) mounted on the vehicle body 2. The communication unit 25 carries out wireless communication with a communication unit 27 of a remote operating device 26. For example, the remote operating device 26 is disposed inside a management center away from the work site where the work vehicle 1 is used. Alternatively, the remote operating device 26 may be portable and may be disposed at the work site.

The vehicle control unit 24 is configured with a computation device such as a CPU, and a memory such as a RAM or a ROM or with a storage device such as a hard disk. The vehicle control unit 24 is programmed to control the work vehicle 1 on the basis of operation signals from the remote operating device 26. Moreover, the vehicle control unit 24 acquires image data acquired by the imaging unit 23 via wires or wirelessly. The vehicle control unit 24 transmits the image data captured by the imaging unit 23 to the communication unit 27 of the remote operating device 26 via the communication unit 25.

The remote operating device 26 includes a remote control unit 28 and an operating unit 29. The remote control unit 28 is configured with a computation device such as a CPU, and a memory such as a RAM or a ROM or with a storage device such as a hard disk.

The operating unit 29 is operated by an operator for driving the work vehicle 1. For example, the operating unit 29 includes an acceleration operating device for adjusting the output of the engine 11. The operating unit 29 includes a work implement operating device for operating the work implement 3. The operating unit 29 includes a ripper operating member for operating the ripper device 31. The operating unit 29 includes a steering operating device for changing the traveling direction of the work vehicle 1 to the right and left. The remote control unit 28 transmits operation signals indicating the operating contents from the operating unit 29 to the communication unit 25 of the work vehicle 1 via the communication unit 27.

The remote operating device 26 includes a display unit 30. The display unit 30 is configured with a display such as a CRT, and LCD, or an OELD. However, the display unit 30 is not limited to the aforementioned displays and may be another type of display.

The communication unit 27 of the remote operating device 26 receives the image data captured by the imaging unit 23 from the communication unit 25 of the work vehicle 1. The remote control unit 28 is programmed to display images indicating the surroundings of the work vehicle 1 on the basis of the image data captured by the imaging unit 23. For example, the remote control unit 28 may synthesize a bird's-eye view image from the images captured by the imaging unit 23 and display the bird's-eye view image on the display unit 30. Alternatively, the remote control unit 28 may display each of the images captured by the imaging unit 23 on the display unit 30.

The operator operates the operating unit 29 while viewing the display unit 30. As a result, the operation signals are transmitted from the communication unit 27 of the remote operating device 26 and the communication unit 25 of the work vehicle 1 receives the operation signals from the remote operating device 26. The vehicle control unit 24 controls the abovementioned engine 11, the pump displacement control unit 19, the work implement control valve 20, and the clutch control valve 22 and the like on the basis of the operation signals. As a result, the operator is able to operate the work vehicle 1 remotely.

The work vehicle 1 (tractor 1A) according to the present embodiment discussed above includes the first discharge port 56 for discharging cooling air provided in the first side surface 5sR of the first exterior member 5c and not in the front surface 5f of the first exterior member 5c. As a result, the possibility of earth and sand entering into the engine compartment 5, which is covered by the first exterior member 5c, from the front can be reduced. Moreover, in comparison to when the cooling air is discharged to the front where the work implement 3 is positioned, the discharging is not blocked and therefore a high cooling efficiency can be achieved.

The second exterior member 8c which includes the first intake port 86 for sucking in the outside air is positioned behind the first exterior member 5c. As a result, the possibility of dust produced by the work by the work implement 3 in front of the engine compartment 5 being sucked in through the first intake port 86 can be reduced.

The first discharge port 56 is positioned on the first side in the vehicle left-right direction and the first intake port 86 is positioned on the second side opposite the first side. As a result, warm air discharged from the first discharge port 56 is not easily sucked in through the first intake port 86. Therefore, the cooling efficiency of the first cooling device 51 can be improved.

The second discharge port 57 for discharging cooling air is further provided in the third side surface 5sL of the first exterior member 5c, the third side surface 5sL being positioned on the aforementioned second side. Therefore, the amount of air per unit of time discharged from the engine compartment 5 can be increased. As a result, the cooling efficiency of the first cooling device 51 can be further improved.

The front surface 5f of the first exterior member 5c includes no opening. Therefore, the possibility of earth and sand entering into the engine compartment 5, which is covered by the first exterior member 5c, from the front can be reduced.

Although the embodiment of the present invention has been described so far, the present invention is not limited to the above embodiment and various modifications may be made within the scope of the invention.

The work vehicle 1 (tractor 1A) is not limited to a remotely operated vehicle and may be a manned work vehicle. Alternatively, an operator cab may be provided on the vehicle body 2 in the same way as a manned work vehicle and a device that is the same as the remote operating device 26 may be provided inside the operator cab. Consequently, the operator is able to easily operate the work vehicle 1 while viewing the display images.

While an example of the first side being the right side and the second side being the left side has been explained in the above embodiment, the aforementioned first discharge port 56, the second discharge port 57, the third discharge port 76, the first intake port 86, and the third intake port 77 may be formed in the exterior members 5c, 7c, and 8c with the first side being the left side and the second side being the right side.

While an example in which a discharge port and an intake port are not formed in the upper surface of the first exterior member 5c has been explained in the above embodiment, a discharge port may be provided in the upper surface of the first exterior member 5c. Consequently, the amount of air discharged from the engine compartment 5 per unit of time can be increased and the cooling efficiency of the first cooling device 51 can be further improved. In this case, it is preferable that a cover is provided on the discharge port so that dust does not enter from above.

While an example in which a discharge port and an intake port are not formed in the front surface 5f of the first exterior member 5c has been explained in the above embodiment, a small discharge port may be provided in the front surface 5f of the first exterior member 5c. Consequently, the amount of air discharged from the engine compartment 5 per unit time can be increased and the cooling efficiency of the first cooling device 51 can be further improved. In this case, while there is a possibility that earth and sand may enter into the engine compartment 5 from the front, the hole (discharge port or intake port) provided in the front surface 5f of the first exterior member 5c is made smaller than the prior art whereby the amount of earth and sand entering into the engine compartment 5 from the front can be greatly decreased in comparison to conventional techniques.

The second cooling device 71 may be disposed in the engine compartment 5 and not in the right housing portion 7. In this case, the second fan 72, the third discharge port 76, and the third intake port 77 may be omitted.

The first intake port 86 may be provided in the rear housing portion 6. Specifically, the first intake port 86 may be provided in the exterior member of the rear housing portion 6. In this case, the rear housing portion 6 may not be the fuel tank and the fuel tank may be moved to another location.

INDUSTRIAL APPLICABILITY

According to the present invention, a tractor can be provided that can reduce the possibility of earth and sand entering into the engine compartment from the front during work.

The invention claimed is:
1. A tractor comprising:
a vehicle body;
an engine disposed on a front side of the vehicle body;
a cooling device disposed behind the engine;
a fan arranged to produce cooling air for the cooling device;
a first exterior member that covers the engine, the cooling device and the fan; and
a second exterior member located behind the first exterior member, the second exterior member including a first intake port arranged to suck in outside air to serve as the cooling air,
the first exterior member being disposed on the front side of the vehicle body,
a first discharge port arranged to discharge the cooling air being provided in a first side surface of the first exterior member, the first side surface being positioned on a first side in a vehicle left-right direction,
a front surface of the first exterior member including no opening,
a second intake port being provided in a rear surface of the first exterior member, the second intake port being arranged to suck in the outside air sucked in through the first intake port and the rear surface being positioned behind the engine, and the first intake port is positioned farther rearward than the second intake port in a vehicle front-rear direction.

2. The tractor according to claim 1, wherein the first intake port is provided in a second side surface of the second exterior member, the second side surface being positioned on a second side opposite the first side.

3. The tractor according to claim 1, wherein the vehicle body has a work area facing a rear surface of the first exterior member.

4. The tractor according to claim 3, wherein the work area is surrounded by an engine compartment covered by the first exterior member, a left housing portion, a right housing portion, and a rear housing portion.

5. The tractor according to claim 1, wherein the cooling device is an after-cooler.

6. The tractor according to claim 1, wherein a second discharge port is further provided in a third side surface of the first exterior member, the second discharge port is arranged to discharge the cooling air, and the third side surface is positioned on a second side opposite the first side.

7. The tractor according to claim 1, further comprising:
a crawler belt; and
an excavation blade disposed on the front side of the vehicle body.

8. The tractor according to claim 7, further comprising:
a first arm with one end attached to a first side portion of the vehicle body positioned on the first side; and
a second arm with one end attached to a second side portion of the vehicle body positioned on a second side opposite the first side,
the first and second arms being attached at other ends thereof to a rear surface of the excavating blade,
the first discharge port facing one of the first and second arms as seen in a top view.

9. The tractor according to claim 1, wherein a work area is provided rearward of the engine, the work area being surrounded by the first exterior member, the second exterior member, and a third exterior member disposed rearward of the first exterior member, the second exterior member and the third exterior member being arranged on opposite sides of the tractor in the vehicle left-right direction.

10. The tractor according to claim 9, further comprising a rear housing portion disposed rearward of the second exterior member and the third exterior member, the work area being surrounded by the first exterior member, the second exterior member, the third exterior member, and the rear housing portion.

11. The tractor according to claim 10, further comprising a lid member arranged and configured to cover the work area, the lid member being arranged above the work area.

12. The tractor according to claim 11, wherein the lid member can be opened and closed, and when the lid member is closed, air drawn in through the first intake port passes through the work area and enters the second intake port.

\* \* \* \* \*